United States Patent
Miles (10) Patent No.: US 9,921,331 B2
(45) Date of Patent: Mar. 20, 2018

(54) MULTI-SENSOR SYSTEM FOR AIRBORNE GEOPHYSICAL PROSPECTING AND METHOD

(71) Applicant: CGG SERVICES SA, Massy (FR)

(72) Inventor: Philip Miles, Rockwood (CA)

(73) Assignee: CGG SERVICES SAS, Massy (FR)

( * ) Notice: Subject to any disclaimer, the term of this patent is extended or adjusted under 35 U.S.C. 154(b) by 68 days.

(21) Appl. No.: 14/966,059

(22) Filed: Dec. 11, 2015

(65) Prior Publication Data

US 2016/0178782 A1    Jun. 23, 2016

Related U.S. Application Data

(60) Provisional application No. 62/092,937, filed on Dec. 17, 2014.

(51) Int. Cl.
*G01V 3/165* (2006.01)
*G01V 3/16* (2006.01)

(52) U.S. Cl.
CPC ............... *G01V 3/165* (2013.01); *G01V 3/16* (2013.01)

(58) Field of Classification Search
CPC . G01V 3/15; G01V 3/16; G01V 3/165; G01V 3/26; G01V 3/28; G01V 3/02; G01V 3/08; G01V 3/081; G01V 3/082; G01V 1/40; G01V 3/18; G01V 3/00; E21B 47/00; E21B 47/02216; E21B 47/0905; E21B 47/044; E21B 47/1015
USPC ................................. 324/330, 331, 339, 345
See application file for complete search history.

(56) References Cited

U.S. PATENT DOCUMENTS

| | | | | |
|---|---|---|---|---|
| 4,906,929 A | * | 3/1990 | Rempt | G01R 33/0327 250/227.19 |
| 4,983,912 A | * | 1/1991 | Roehrlein | G01R 33/00 324/202 |
| 7,646,201 B2 | * | 1/2010 | Miles | G01V 3/165 324/330 |
| 2009/0072834 A1 | * | 3/2009 | Dickson | G01V 3/107 324/357 |
| 2009/0284258 A1 | * | 11/2009 | Morrison | B64B 1/02 324/330 |
| 2014/0012505 A1 | * | 1/2014 | Smith | G01V 3/08 702/2 |

FOREIGN PATENT DOCUMENTS

WO    2013/138908 A1    9/2013

OTHER PUBLICATIONS

Smith, Torquil J., et al., Multi-transmitter multi-receiver null coupled systems for inductive detection and characterization of metallic objects (Oct. 17, 2005) (available at https://escholarship.org/uc/item/5qf2r0p0).*

* cited by examiner

*Primary Examiner* — Tung X Nguyen
*Assistant Examiner* — Robert P Alejnikov, Jr.
(74) *Attorney, Agent, or Firm* — Patent Portfolio Builders PLLC (57) ABSTRACT

A multi-sensor electromagnetic (EM) system and method for measuring gradients of EM signals. The multi-sensor EM system includes a frame; a transmitter device attached to the frame and configured to generate a primary EM field; a receiver device attached to the frame and configured to record a secondary EM field generated by the earth after being excited by the primary EM field; and a gradient sensor device attached to the frame and configured to record a gradient of the secondary EM field.

20 Claims, 10 Drawing Sheets

MULTI-SENSOR SYSTEM FOR AIRBORNE GEOPHYSICAL PROSPECTING AND METHOD

CROSS-REFERENCE TO RELATED APPLICATIONS

This application claims priority and benefit from U.S. Provisional Patent Application No. 62/092,937, filed on Dec. 17, 2014, the entire disclosure of which is incorporated herein by reference.

BACKGROUND

Technical Field

Embodiments of the subject matter disclosed herein generally relate to methods and systems for generating and/or measuring electromagnetic (EM) fields and, more particularly, to mechanisms and techniques for enhancing detection of near surface, lateral or vertical conductive targets.

Discussion of the Background

EM surveying is a method of geophysical exploration to determine the properties of a portion of the earth's subsurface, information that is especially helpful in the oil and gas industry and the mining industry. EM surveys may be based on a controlled source that generates a primary EM field which carries EM energy into the earth, which induces eddy currents in the earth. The eddy currents generate a secondary EM field or ground response. By measuring the secondary field with an EM receiver, it is possible to estimate the depth and/or composition of the subsurface features. These features may be associated with subterranean hydrocarbon deposits.

Figure 1:
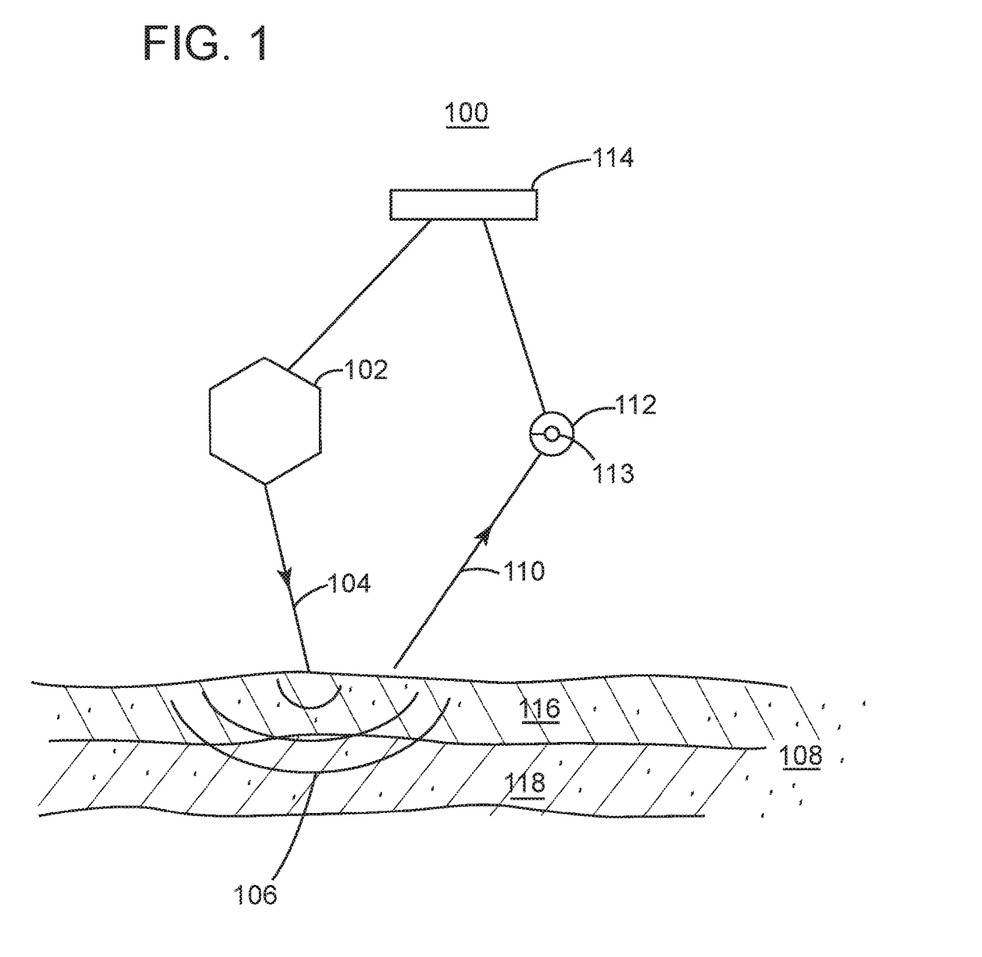
FIG. 1 is a schematic diagram of an EM acquisition system.

A schematic airborne EM survey system 100 generally includes, as illustrated in FIG. 1, a transmitter 102 for generating the primary EM field 104 that is directed toward the earth. When primary EM field 104 enters the ground 108, it induces eddy currents 106 inside layers 116 and 118 of the earth. These eddy currents 106 generate a secondary electromagnetic field or ground response 110. An EM receiver 112 then measures the response 110 of the ground. Transmitter 102 and receiver 112 may be connected to an aircraft 114 so that a large area of the ground is swept. Receiver 112 may be located concentric and/or coplanar with transmitter 102. A second receiver 113 may also be added.

However, the existing EM surveying systems are not sensitive to near surface formation detection as the signals usually associated with such formation are buried in either ambient or geologic noise. Thus, there is a need to have a new system that is capable of measuring signals associated with near surface formation detection.

SUMMARY

One or more of the embodiments discussed herein illustrate a new multi-sensor EM system that is capable of simultaneously recording not only EM signals associated with the underground formations, but also a gradient of the secondary EM fields.

According to one embodiment, there is a multi-sensor electromagnetic system for measuring EM signals. The multi-sensor EM system includes a frame, a transmitter device attached to the frame and configured to generate a primary EM field, a receiver device attached to the frame and configured to record a secondary EM field generated by the earth after being excited by the primary EM field, and a gradient sensor device attached to the frame and configured to record a gradient of the secondary EM field.

According to another embodiment, there is an electromagnetic surveying system for measuring EM signals. The EM surveying system includes an airborne carrier configured to fly over ground, a multi-sensor EM system configured to generate a primary EM field and to record a secondary EM field generated by the earth as a response to the primary EM field, and a towing system connecting the airborne carrier to the multi-sensor EM system. The multi-sensor EM system is also configured to measure a gradient of the secondary EM field.

According to still another embodiment, there is a method for recording electromagnetic signals during an airborne EM survey. The method includes flying a multi-sensor EM system, generating a primary EM field with a transmitter device attached to a frame of the multi-sensor EM system, recording, with a receiver device attached to the frame, a secondary EM field generated by the earth after being excited by the primary EM field, and recording, with a gradient sensor device attached to the frame, a gradient of the secondary EM field.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a multi-sensor EM system having three-component sensors. However, the embodiments to be discussed next are not limited to such sensors, but they may work with fewer components per sensor.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a multi-sensor EM system includes at least one three-component transmitter and a multi-sensor. The multi-sensor may include a three-component receiver and a three-component gradient sensor. The transmitter and multi-sensors are attached to a platform that is suitable for airborne surveys. In one application, the gradient sensor includes gradient coils placed symmetrically about the transmitter coils to cancel the primary field, because the sum of the two coils will have no primary field. This allows greater sensitivity to the secondary field gradient. Details of the multi-sensor EM system are now discussed with regard to the figures.

Figure 2:
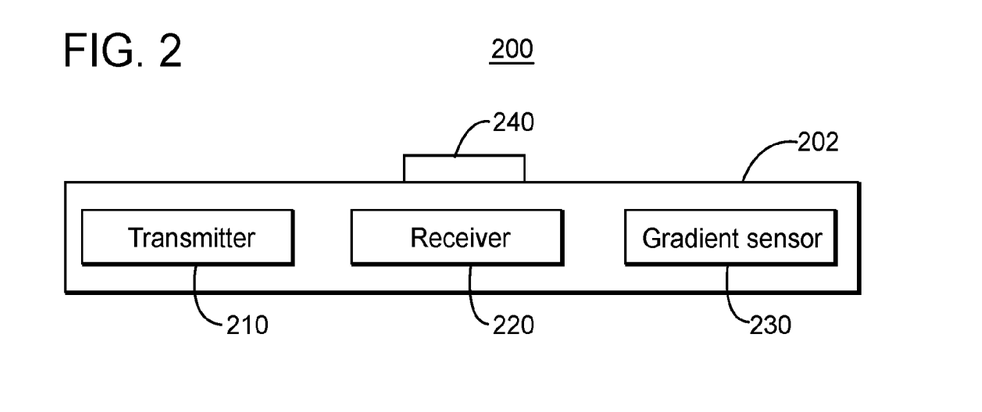
FIG. 2 is a schematic diagram of a multi-sensor EM acquisition system.
Figure 3:
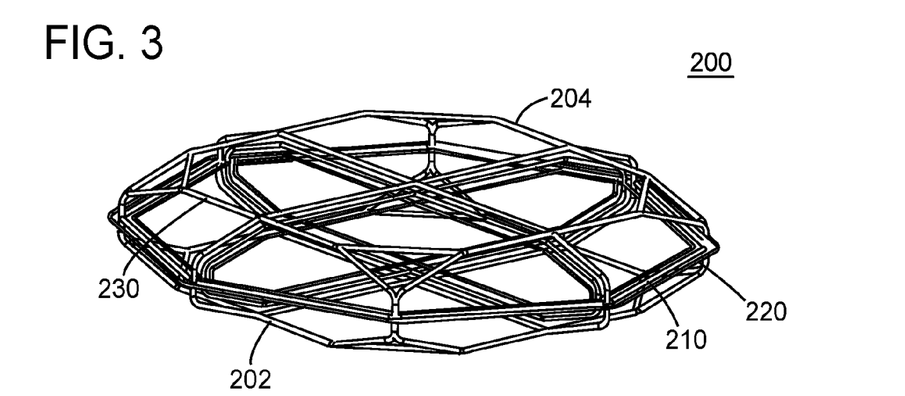
FIG. 3 is a general view of the multi-sensor EM system.

FIG. 2 shows one embodiment of a multi-sensor EM system 200 that is designed for airborne geophysical exploration. Multi-sensor EM system 200 includes a rigid frame 202 that hosts a three-component transmitter device 210, a three-component receiver device 220 and a three-component gradient sensor device 230. Frame 202 may be made out of tubes 204 as illustrated in FIG. 3. Tubes 204 are hollow inside and configured to accommodate one or more wires that form the transmitter, receiver and/or gradient sensor coils. Tubes 204 are connected to each other to form a circle, hexagon or any desired shape. Tubes 204 may be made of plastic or other insulator material. The tubes are light but rigid, so that they do not allow a deformation of the coils located inside the tubes. The tubes are attached to each other as known in the art.

Returning to FIG. 2, a local control device 240 may be located on the frame 202 and it is electrically connected to the transmitter, receiver and gradient sensor devices. Local control device 240 may communicate with a global control device (not shown, but located, for example, on the airborne carrier) for coordinating the generation of the primary EM fields in the transmitter device and for instructing the receiver and the gradient sensor devices when to record the secondary EM signals. The local control device may be configured to send commands to the transmitter device to sequentially generate magnetic fields in three mutually orthogonal orientations. These magnetic fields may be calculated and generated in such a way that a combination of the fields from multiple transmitters enhances the fields at specific locations and in a specific orientation. This combination has the potential to increase the signal-to-noise thereof, which is desirable. In one embodiment, the local control device is configured to instruct the three-component transmitter device to continuously generate arbitrary waveforms at similar or unique pulse repetition rates. Those skilled in the art would understand that the local and/or global control devices may be configured to instruct the three-component transmitter device to generate any desired shape EM signal.

In addition, the local and/or global control devices may be configured to combine the various EM signals received from the receiver device and the gradient sensor device to enhance the near surface, lateral and/or vertical conductive underground target formations. Such algorithms are known in the art and thus, they are not discussed herein.

Figure 4:
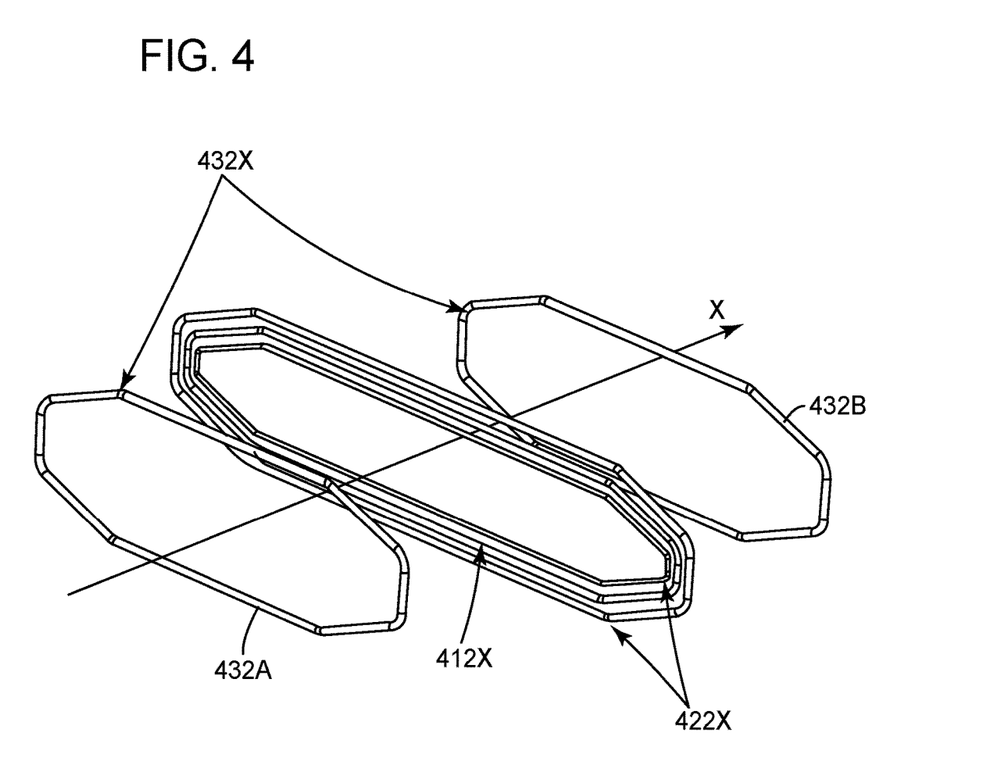
FIG. 4 illustrates the X axis coils corresponding to a transmitter, receiver and gradient sensor of the multi-sensor EM system.

Each of the transmitter device 210, receiver device 220 and gradient sensors device 230 is now discussed in detail. FIG. 4 shows the longitudinal components of each of the devices 210, 220 and 230. More specifically, FIG. 4 shows the longitudinal transmitter coil 412X of the transmitter device 210, the longitudinal receiver coil 422X of the receiver device 220, and the longitudinal gradient sensor coil 432X of the gradient sensor device 430. All these components are perpendicular to the X axis, which may be considered to indicate the travel direction of the multi-sensor EM system's carrier. FIG. 4 shows that longitudinal transmitter coil 412X is concentric and between the two longitudinal receiver coils 422X.

Figure 5:
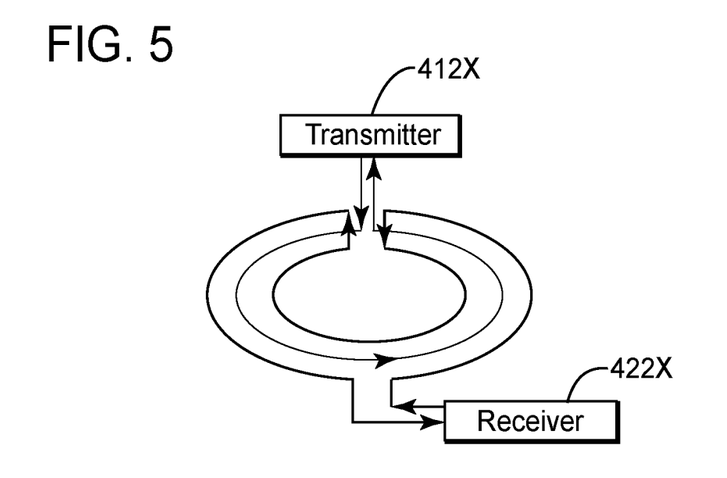
FIG. 5 illustrates the transmitter and receiver coil position relative to each other.

The specific arrangement of the receiver coils is called concentric null-coupled receiver and it is illustrated in more detail in FIG. 5. FIG. 5 shows that the receiver coil 422X has in fact two concentric coils located in a same plane and these two coils are also concentric and located in a same plane with the transmitter coil 412X. Currents flowing through the two concentric receiver coils have opposite directions. This arrangement of the receiver coils contains substantially equal and opposite components of the transmitted field. This provides an overall increase in sensitivity for the secondary fields of interest. The system may also include one or more adjustable components to fine tune the primary field nulling.

Figure 6:
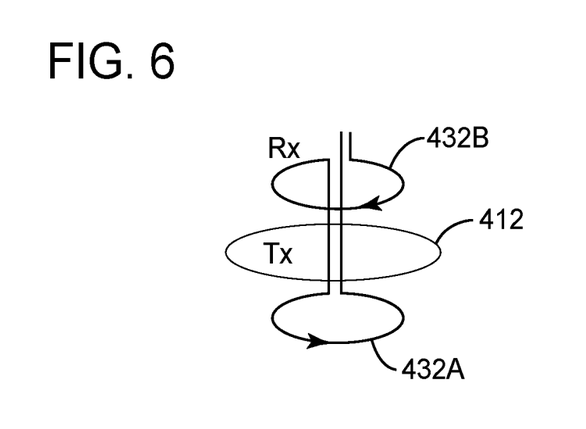
FIG. 6 illustrates the arrangement of the transmitter and gradient sensor coils relative to each other.

FIG. 4 also shows the gradient sensor coil 432X, which includes two parallel elements (coils) 432A and 432B located symmetrically about each transmitter coil 412X. Each coil pair 432A and 432B is wound in series, opposite to each other, as illustrated in FIG. 6, to provide a signal that is substantially devoid of the primary EM field and ambient noise, but it is sensitive to the spatial gradient of the secondary fields of interest for each axis. Currents flowing through the coil pair 432A and 432B have opposite directions. This allows for detection of near surface structures that might otherwise be buried in either ambient or geologic noise.

Figure 7:
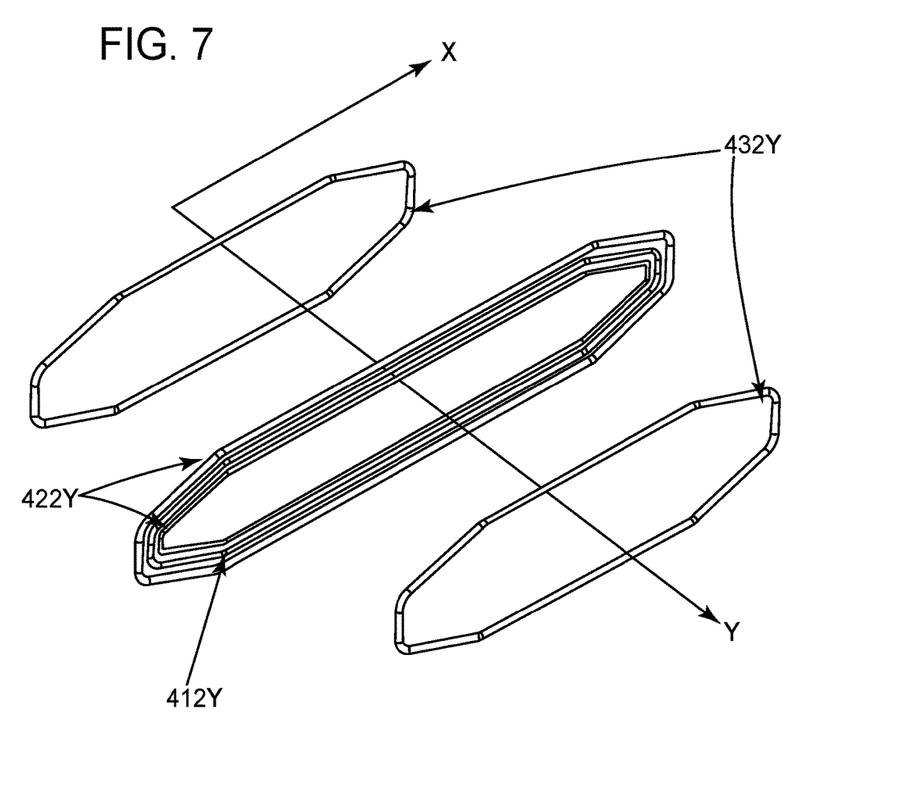
FIG. 7 illustrates the Y axis coils corresponding to a transmitter, receiver and gradient sensor of the multi-sensor EM system.
Figure 8:
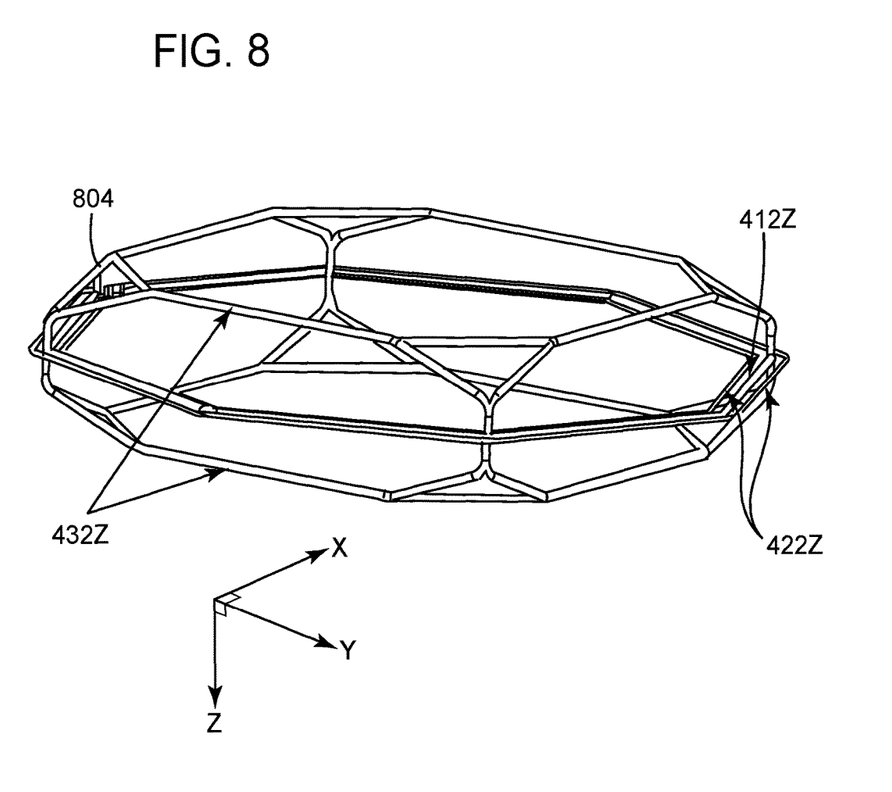
FIG. 8 illustrates the Z axis coils corresponding to a transmitter, receiver and gradient sensor of the multi-sensor EM system.

FIG. 7 shows the relative positions of the transmitter component 412Y, receiver component 422Y and gradient sensor component 432Y along the Y axis, which is substantially identical to the structure illustrated in FIG. 4. FIG. 8 shows the Z components 412Z, 422Z and 432Z of the transmitter, receiver and gradient sensor devices, respectively. Note that FIG. 8 also shows some of the tubes 804 forming the frame that supports the coils discussed above.

Figure 9:
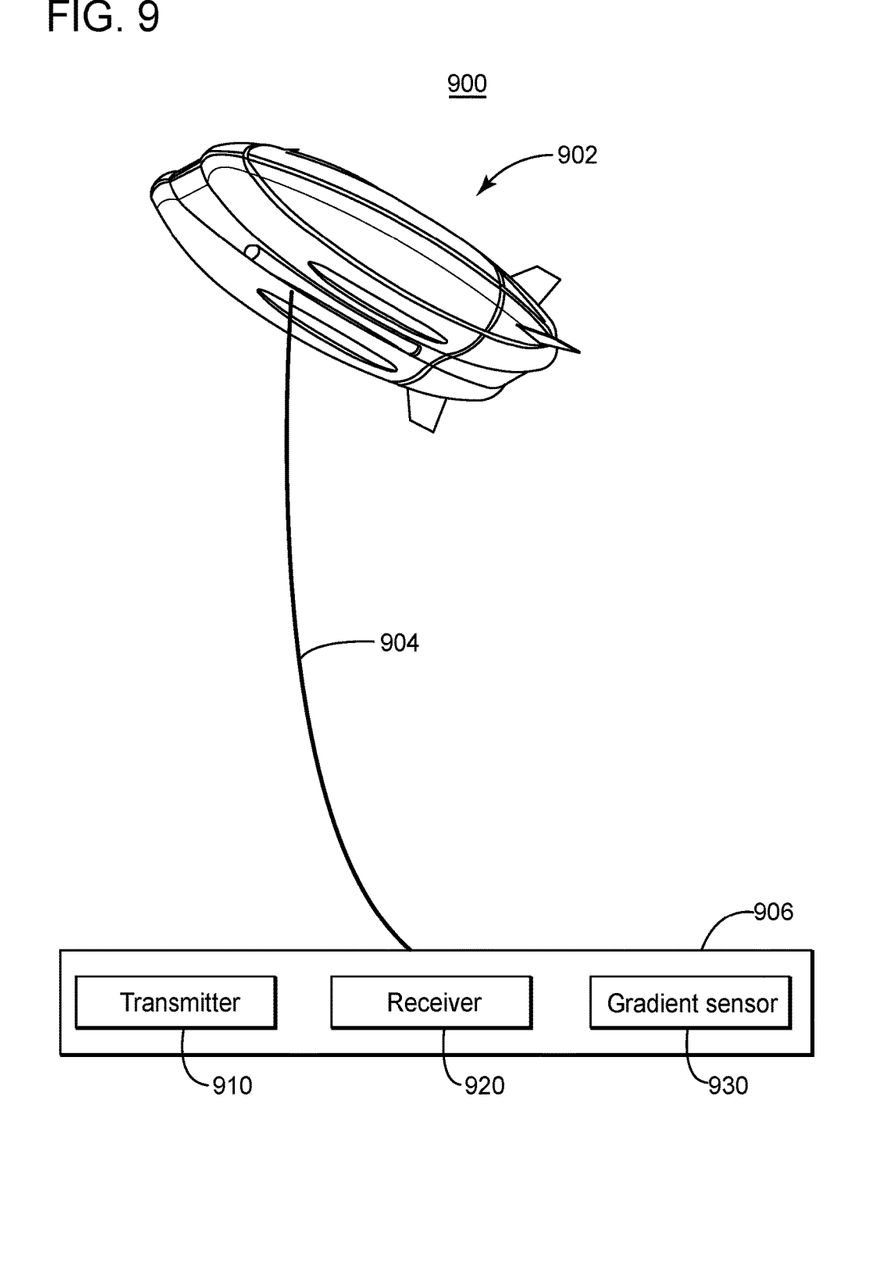
FIG. 9 is a schematic diagram of a multi-sensor EM system towed with an airborne carrier.

The structural components (frame 202, tubes 804 and other connecting devices not shown) supporting the three axis transmitters, receivers and gradient coils may be assembled as a stand-alone unit of arbitrary shape to be towed under a carrier. FIG. 9 shows such a system 900 having a carrier 902 that tows with a towing system 904 (e.g., ropes and/or cable) a multi-sensor EM system 906. System 906 includes at least a transmitter device 910, receiver device 920 and gradient sensor device 930 as discussed in the previous embodiments. Carrier 902 may be a light weight helicopter or a lighter than air vehicle or a hybrid air vehicle or any aircraft. A hybrid air vehicle is defined by two components: a propelling mechanism for generating thrust and an enclosure that houses a lighter than the air gas that provides positive buoyancy. In this way, the thrust generated by the propelling mechanism is not used to maintain a given altitude of the hybrid vehicle. Such vehicles can cover a larger physical area resulting in greater sensitivity and low flight speeds, which results in increasing data density and lower overall noise levels (no vibrating engines).

In one embodiment, the multi-sensor EM system is substantially composed of composite structures formed in such a way as to provide fundamentally a symmetric three component transmitter. One transmitter is vertically perpendicular to the flight direction (X), one transmitter is horizontally perpendicular to the flight direction and one transmitter is horizontally parallel to the flight direction. The transmitters may have the same physical area. However, inflight loading related to airflow over the structures limits the practical size of the X and Y transmitters to approximately ⅕ to ½ the area of the Z looking coil. The transmitter device structure may be tubular or a composite 1-beam as disclosed in U.S. Pat. No. 7,646,201, the entire content of which is incorporated herein by reference. The transmitter coils are collocated forming a substantially rigid structure. Typical transmitter pulse repetition frequencies include 30 Hz for each axis, if fired sequentially, or 29.5 Hz, 30.0 Hz and 31.0 Hz in each of the X, Y and Z axis. In some cases, it is possible transmitting similar waveforms on each axis at the same pulse repetition rate. In one embodiment, it may be desirable to independently control the power levels of each axis to direct the primary magnetic field towards a desired target (e.g., along a chosen direction). The power levels may also be controlled in a continuously varying fashion to essentially sweep the resulting magnetic field to ensure maximum coupling of the directed field with a conductive target of arbitrary geometry. The power levels may be controlled by the local and/or global control devices discussed above. This approach may be particularly useful in the field of unexploded ordinance mapping.

Figure 10:
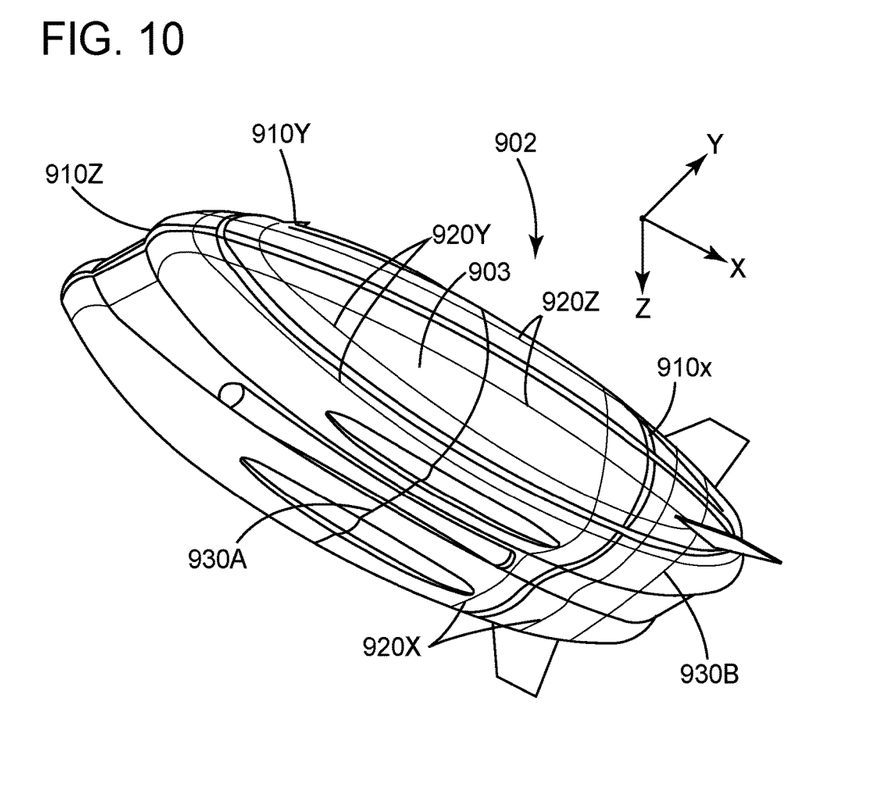
FIG. 10 shows the multi-sensor EM system disposed over a hybrid air vehicle.

FIG. 10 illustrates an embodiment in which carrier 902 includes three transmitting coils 910X, 910Y and 910Z that generate EM signals for penetrating the earth. Carrier 902 is a hybrid air vehicle. Each of the transmitting coils includes a coil of wire extending around a gas envelope 903 of the carrier. Gas envelope 903 is configured to host the lighter than air gas. For example, a first transmitting coil 910X is oriented in a vertical plane extending around the gas envelope of the carrier 902, transversely to the longitudinal axis of the carrier, and thereby, having a dipole moment along the X-axis. Coil 910X may be located generally midway between the nose and the tail of the carrier to maximize its area. However, coil 910X may be located anywhere along the carrier. A second transmitting coil 910Y is oriented in a vertical plane extending around the envelope 903, from the nose to the tail, with a dipole moment on the Y-axis. A third transmitting coil 910Z is oriented in a horizontal plane extending around the gas envelope of the carrier, from the nose to the tail, with a dipole moment on the Z-axis.

According to another embodiment, the transmitting coils 910X-Z are generally elliptical in shape. Alternatively, the transmitting coils can be of other shapes that can be accommodated by the carrier. In one embodiment, the coils follow the shape of the envelope 903. Receiver coils 920X-Z, which measure the ground response due to the excitation from the transmitting coils, may be located next to the transmitting coils, as illustrated in FIG. 10. The use of one or more three-component receiver(s) 920, along with the orientations of the transmitting coils 910X-Z thereby allow collection of data in three different orthogonal directions, being nominally vertically perpendicular to the direction of flight, horizontally parallel to the direction of flight and horizontally perpendicular to the direction of flight. The gradient sensor device 930 may also be located on the carrier. For simplicity, FIG. 10 shows only the X components 930A and 930B of the gradient sensor device 930.

The multi-sensor EM system discussed herein takes 12 measurements of the EM field for each transmitter firing sequence. These measurements advantageously can be combined to enhance near surface, lateral or vertical conductive targets. However, in one embodiment, the multi-sensor EM system may have less than 12 measurements, i.e., either one of the transmitter, receiver and gradient sensor devices may have less than three components. For example, it is possible to build a single axis system that includes just gradient coils. It is also possible to build a system that includes a transmitter and a concentric null coupled receiver, which is consistent in function with all other TDEM systems assuming a Z orientation.

According to still another embodiment, an additional payload that can be carried by hybrid air vehicle 902, as compared to the payload of a traditional aircraft or helicopter, may also be used to carry a large auxiliary power unit (not shown) with sufficient electrical capacity to increase the output power of one or more of the transmitter coils, e.g., by a factor of twenty or more. For example, the transmitter power of the transmitter device 910 may be as much as 40,000,000 amp-meters square ($Am^2$) whereas the most powerful system currently mounted on helicopter or aircraft is in the order of 2,000,000 $Am^2$. The null-coupled receiver device allows for increases in transmitter moment without sacrificing receiver sensitivity.

Figure 11:
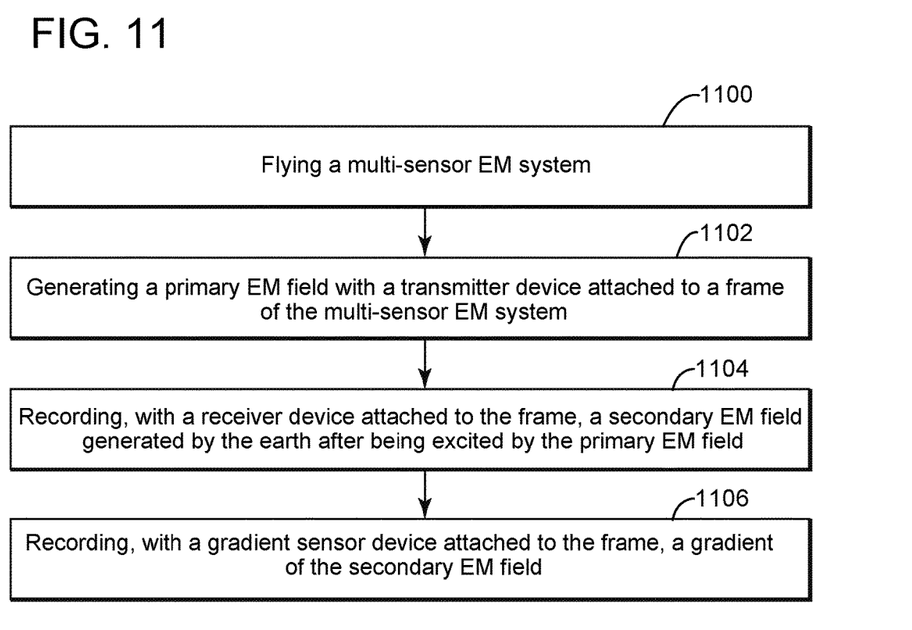
FIG. 11 is a flowchart of a method for collecting EM data with a multi-sensor EM system.

A method for recording secondary magnetic fields with an airborne multi-sensor EM system is now discussed with regard to FIG. 11. The method includes a step 1100 of flying a multi-sensor EM system, a step 1102 of generating a primary EM field with a transmitter device attached to a frame of the multi-sensor EM system, a step 1104 of recording, with a receiver device attached to the frame, a secondary EM field generated by the earth after being excited by the primary EM field, and a step 1106 of recording, with a gradient sensor device attached to the frame, a gradient of the secondary EM field. The multi-sensor EM system may be any of the systems discussed above.

There are many possible implementations of the multi-sensor EM system discussed above. The multi-sensor EM system may include, in addition to the components discussed above, many peripheral sensors to determine the position or orientation or state of the electromagnetic measurement, such as a Global Positioning System (GPS), radar or laser altimeter, gyroscopes or inclinometers measuring transmitter or sensor positions, thermometers, or other sensors measuring other geophysical data (such as radar or laser for topography, gravity or gradiometers sensors, spectrometer sensors, magnetometers to measure the ambient earth magnetic field, etc.). Consequently, there are also many different methods to record, process, combine and control all of these signals and sensors.

Figure 12:
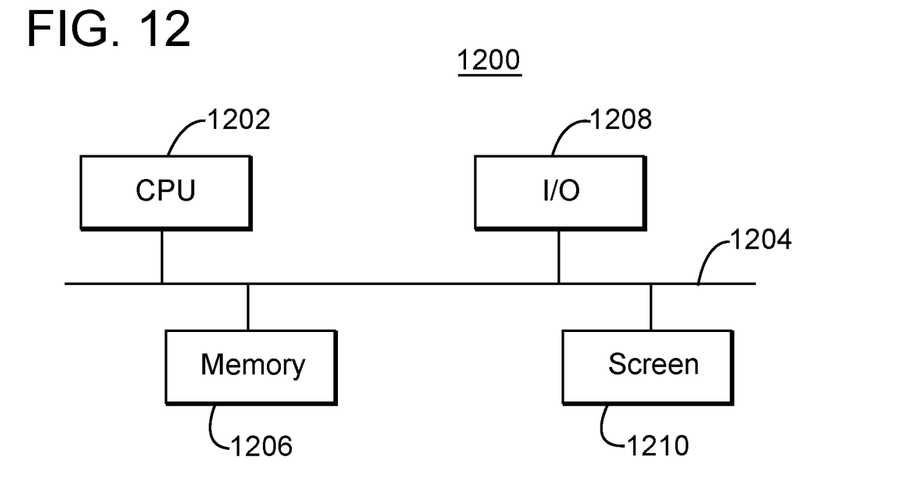
FIG. 12 is a schematic diagram of a processing unit that coordinates the transmitter, receiver and gradient sensor devices.

As also will be appreciated by one skilled in the art, the exemplary embodiments may be embodied in a processing unit 1200, as illustrated in FIG. 12. Processing unit 1200 includes a processor 1202 that is connected through a bus 1204 to a storage device 1206. Processing unit 1200 may also include an input/output interface 1208 through which data can be exchanged with the processor and/or storage device. For example, a keyboard, mouse or other device may be connected to the input/output interface 1208 to send commands to the processor and/or to collect data stored in storage device or to provide data necessary to the processor. In one application, the processor combines the 12 measurements for generating, for example, a raw image of the underground formations. Also, the processor may be used to calculate, for example, the positions of the coils. Results of this or another algorithm may be visualized on a screen 1210. The method discussed above may be implemented in a wireless communication device or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices or magnetic storage devices such as a floppy disk or magnetic tape. Other non-limiting examples of computer-readable media include flash-type memories or other known types of memories.

For greater clarity, the figures used to help describe the invention are simplified to illustrate key features. For example, figures are not to scale and certain elements may be disproportionate in size and/or location. Furthermore, it is anticipated that the shape of various components may be different when reduced to practice, for example. The patentable scope of the subject matter is defined by the claims, and may include other examples that occur to those skilled in the art. Such other examples are intended to be within the scope of the claims. Those skilled in the art would appreciate that features from any embodiments may be combined to generate a new embodiment.

The disclosed embodiments provide a method and multi-sensor EM system capable of recording gradient EM signals indicative of a near surface formation, in addition to the traditional EM signals. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A multi-sensor electromagnetic (EM) system for measuring EM signals, the multi-sensor EM system comprising:
   a frame;
   a transmitter device attached to the frame and configured to generate a primary EM field;
   a receiver device attached to the frame and configured to record a secondary EM field generated by the earth after being excited by the primary EM field; and
   a gradient sensor device attached to the frame and configured to record a gradient of the secondary EM field with two parallel coils,
   wherein the two parallel coils sandwich a transmitter coil of the transmitter device and the two parallel coils are placed symmetrically about the transmitter coil.

2. The system of claim 1, wherein the frame is made of hollow tubes that host coils of the transmitter device, receiver device and the gradient sensor device.

3. The system of claim 1, wherein the transmitter device includes three transmitter coils perpendicular to each other, the receiver device includes three receiver coils perpendicular to each other, and the gradient sensor device includes three gradient coils perpendicular to each other, one of the three gradient coils including the two parallel coils.

4. The system of claim 3, wherein each of the three gradient coils includes two parallel coils that sandwich a corresponding transmitter coil.

5. The system of claim 1, wherein the two parallel coils are electrically connected to each other so that currents flowing through the two coils have opposite directions.

6. The system of claim 3, wherein a receiver coil is a null-coupled coil.

7. The system of claim 6, wherein the null-coupled coil includes two concentric coils located in a same plane and current flowing through the two concentric coils flow in opposite directions.

8. The system of claim 7, wherein the two concentric coils are located in a same plane with a corresponding transmitter coil.

9. The system of claim 8, wherein the two concentric coils are concentric with the transmitter coil.

10. An electromagnetic (EM) surveying system for measuring EM signals, the EM surveying system comprising:
    an airborne carrier configured to fly over ground;
    a multi-sensor EM system configured to generate a primary EM field and to record a secondary EM field generated by the earth as a response to the primary EM field; and
    a towing system connecting the airborne carrier to the multi-sensor EM system
    wherein the multi-sensor EM system is also configured to measure a gradient of the secondary EM field with two parallel coils of a gradient sensor device, and
    wherein the two parallel coils sandwich a transmitter coil of a transmitter device and the two parallel coils are placed symmetrically about the transmitter coil.

11. The system of claim 10, wherein the multi-sensor EM system comprises:
    a frame;
    the transmitter device attached to the frame and configured to generate the primary EM field;
    a receiver device attached to the frame and configured to record the secondary EM field; and
    the gradient sensor device attached to the frame and configured to record the gradient of the secondary EM field.

12. The system of claim 10, wherein the carrier is a hybrid air vehicle.

13. The system of claim 11, wherein the transmitter device includes three transmitter coils perpendicular to each other, the receiver device includes three receiver coils perpendicular to each other, and the gradient sensor device includes three gradient coils perpendicular to each other, one of the three gradient coils including the two parallel coils.

14. The system of claim 13, wherein each of the three gradient coils includes two parallel coils that sandwich a corresponding transmitter coil.

15. The system of claim 10, wherein the two parallel coils are electrically connected to each other so that currents flowing through the two coils have opposite directions.

16. The system of claim 13, wherein a receiver coil is a null-coupled coil and the null-coupled coil includes two concentric coils located in a same plane and current flowing through the two concentric coils flow in opposite directions, and wherein the two concentric coils are located in a same plane with a corresponding transmitter coil and the two concentric coils are concentric with the transmitter coil.

17. A method for recording electromagnetic (EM) signals during an airborne EM survey, the method comprising:
   flying a multi-sensor EM system;
   generating a primary EM field with a transmitter device attached to a frame of the multi-sensor EM system;
   recording, with a receiver device attached to the frame, a secondary EM field generated by the earth after being excited by the primary EM field; and
   recording, with two parallel coils of a gradient sensor device attached to the frame, a gradient of the secondary EM field,
   wherein the two parallel coils sandwich a transmitter coil of the transmitter device and the two parallel coils are placed symmetrically about the transmitter coil.

18. The method of claim 17, wherein the transmitter device includes three transmitter coils perpendicular to each other, the receiver device includes three receiver coils perpendicular to each other, and the gradient sensor device includes three gradient coils perpendicular to each other, one of the three gradient coils including the two parallel coils.

19. The method of claim 18, wherein each of the three gradient coils includes two parallel coils that sandwich a corresponding transmitter coil.

20. The method of claim 17, wherein the two parallel coils are electrically connected to each other so that currents flowing through the two coils have opposite directions.

* * * * *